US012779828B2

(12) United States Patent
Filippini

(10) Patent No.: US 12,779,828 B2
(45) Date of Patent: Nov. 3, 2026

(54) PADDLE RACKET MANUFACTURING METHOD

(71) Applicant: Gearbox, Inc., San Diego, CA (US)

(72) Inventor: Rafael Garcia Filippini, San Diego, CA (US)

(73) Assignee: Gearbox, Inc., San Diego, CA (US)

( * ) Notice: Subject to any disclaimer, the term of this patent is extended or adjusted under 35 U.S.C. 154(b) by 39 days.

(21) Appl. No.: 18/813,719

(22) Filed: Aug. 23, 2024

(65) Prior Publication Data

US 2026/0054471 A1 Feb. 26, 2026

(51) Int. Cl.

| | |
|---|---|
| ***B29C 65/00*** | (2006.01) |
| ***A63B 59/42*** | (2015.01) |
| ***B32B 3/12*** | (2006.01) |
| ***B32B 3/18*** | (2006.01) |
| ***B32B 5/02*** | (2006.01) |
| ***B32B 27/12*** | (2006.01) |
| ***B32B 27/20*** | (2006.01) |
| ***B32B 27/30*** | (2006.01) |
| ***B32B 27/32*** | (2006.01) |
| *A63B 102/08* | (2015.01) |
| *B29C 65/02* | (2006.01) |
| *B29C 65/18* | (2006.01) |
| *B29C 65/48* | (2006.01) |

(52) U.S. Cl.

CPC .............. *B32B 27/12* (2013.01); *A63B 59/42* (2015.10); *B32B 3/12* (2013.01); *B32B 3/18* (2013.01); *B32B 5/02* (2013.01); *B32B 27/20* (2013.01); *B32B 27/306* (2013.01); *B32B 27/32* (2013.01); *A63B 2102/08* (2015.10); *A63B 2209/02* (2013.01); *B29C 65/004* (2013.01); *B29C 65/02* (2013.01); *B29C 65/18* (2013.01); *B29C 65/48* (2013.01); *B32B 2250/40* (2013.01); *B32B 2262/101* (2013.01); *B32B 2262/106* (2013.01)

(58) Field of Classification Search

CPC ....... B29C 65/004; B29C 65/02; B29C 65/18; B29C 65/48

See application file for complete search history.

(56) References Cited

U.S. PATENT DOCUMENTS

2016/0107053 A1* 4/2016 Pree ....................... A63B 59/42 473/529
2022/0032141 A1* 2/2022 Brents .................... A63B 60/54
2022/0273997 A1* 9/2022 Zheng .................... A63B 60/08

* cited by examiner

*Primary Examiner* — Philip C Tucker
*Assistant Examiner* — Nickolas R Harm
(74) *Attorney, Agent, or Firm* — Best & Flanagan LLP

(57) ABSTRACT

A paddle racket manufacturing method comprises a material preparation step, a classification step, an adiabatic step, a cooling step and a bonding step, the material preparation step preparing a plurality of processing components; the classification step classifying each of the plurality of processing components into a pre-adiabatic processing component and a non-adiabatic processing component according to a heating characteristic and a pressurizing characteristic corresponding to a material characteristic of its composition; the adiabatic step applying an adiabatic heating on the pre-adiabatic processing component according to the material characteristic to form a processing component already processed with adiabatic process; the cooling step cooling the processing component already processed with adiabatic process to normal temperature; and the bonding step using cold bonding to connect the processing component already processed with adiabatic process with the non-adiabatic processing component.

10 Claims, 7 Drawing Sheets

PADDLE RACKET MANUFACTURING METHOD

FIELD OF THE INVENTION

The invention relates to a paddle racket, more particularly to a paddle racket manufacturing method using classified processing.

DESCRIPTION OF THE RELATED ART

Paddle racket is suitable for using in pickleball paddle, table tennis paddle or beach paddle. Different paddle rackets can be used in different ball sports.

In recent years, paddle rackets have gradually used lighter fiber materials to reduce weight according to requirements. The fiber materials are glass fiber or carbon fiber. However, different parts have different material choices. Fiber materials are only one of the choices. For the combination of different materials, the current paddle racket manufacturing method is to assemble the various parts together before placing in the mold and heating and/or pressurizing the various parts together.

Please refer to U.S. patent application Ser. No. 15/703,011, filed Sep. 13, 2017. Taking the honeycomb structure selected for the core of the paddle body as an example, FIG. 5 of the drawings and the specification paragraph [0007] mention that the core composition of the paddle body is plastic, and FIG. 5 of the drawings and the specification paragraph [0009] mention that the frame of the paddle body is composed of carbon fiber.

Plastic and carbon fiber inherently have different material properties. If they are put into the mold together and the different material properties are heated and/or pressurized uniformly, the final core quality of plastic that is a heat-sensitive material will be affected by material degradation or deterioration caused by excessive heating, and the basis for quality evaluation such as stiffness, deflection, flexion, coefficient of restitution (COR) will be affected.

Once they are affected, it will be detrimental to controlling the time the ball stays on the paddle racket, and it will also be detrimental to controlling the rotation force of the paddle racket on the ball.

SUMMARY OF THE INVENTION

An object of the invention is to provide a paddle racket manufacturing method to solve the above problems mentioned in the prior art.

According to one embodiment of the invention, a paddle racket manufacturing method is provided, comprising a material preparation step, a classification step, an adiabatic step, a cooling step and a bonding step, the material preparation step preparing a plurality of processing components of a paddle racket; the classification step classifying each of the plurality of processing components into a pre-adiabatic processing component and a non-adiabatic processing component according to a heating characteristic and a pressurizing characteristic corresponding to a material characteristic of its composition, the pre-adiabatic processing component having a base material and a fiber layer covering the base material; the adiabatic step preparing a mold, placing the pre-adiabatic processing component into a mold cavity of the mold, applying an adiabatic heating on the pre-adiabatic processing component according to the material characteristic to form a processing component already processed with adiabatic process, the fiber layer of the processing component already processed with adiabatic process adhering to the base material; the cooling step cooling the processing component already processed with adiabatic process to normal temperature; and the bonding step using cold bonding without using heat to connect the processing component already processed with adiabatic process with the non-adiabatic processing component.

The paddle racket manufacturing method, wherein the plurality of processing components comprise a paddle body and a grip body, the paddle body has a core, a frame and two surface layers, the frame is disposed on a peripheral side of the core, the two surface layers are spaced apart from each other and respectively assembled on the core and the frame on two sides of the paddle body, the grip body is formed from a bottom side of the frame of the paddle body.

The paddle racket manufacturing method, wherein the frame is classified as the pre-adiabatic processing component, the base material of the frame is composed of polyethylene or ethylene vinyl acetate copolymer, the fiber layer of the frame is composed of carbon fiber or glass fiber, the two surface layers are classified as the pre-adiabatic processing components, and the two surface layers are composed of carbon fiber or glass fiber.

The paddle racket manufacturing method, wherein the non-adiabatic processing component is a heat-sensitive material, the heat-sensitive material is plastic, polyethylene or ethylene vinyl acetate copolymer.

The paddle racket manufacturing method, wherein the paddle body is a rib structure, the core has a first component classified as the pre-adiabatic processing component, the frame is disposed on a peripheral side of the first component, the base material of the first component is composed of hard plastic or hard foam, and the fiber layer of the first component is composed of carbon fiber or glass fiber.

The paddle racket manufacturing method, wherein the paddle body is a honeycomb structure, the core has a first component classified as the non-adiabatic processing component, the frame is disposed on a peripheral side of the first component, and the first component is composed of plastic.

The paddle racket manufacturing method, wherein the paddle body is a centralized core, the core has a first component classified as the pre-adiabatic processing component, the base material of the first component is composed of hard plastic or hard foam, the fiber layer of the first component is composed of carbon fiber or glass fiber, the core has a second component disposed between the frame and the first component, the second component is classified as the non-adiabatic processing component, and the second component is composed of polyethylene or ethylene vinyl acetate copolymer.

The paddle racket manufacturing method, wherein the paddle body is a centralized core, the core has a first component classified as the non-adiabatic processing component, the first component is composed of plastic, the core has a second component disposed between the frame and the first component, the second component is classified as the non-adiabatic processing component, and the second component is composed of polyethylene or ethylene vinyl acetate copolymer.

The paddle racket manufacturing method, wherein the adiabatic step applies the adiabatic heating and uses a bladder molding to form the processing component already processed with adiabatic process.

The paddle racket manufacturing method, wherein the mold of the adiabatic step has an upper mold and a lower mold, the upper mold is combined with the lower mold and a pressure is applied to form the mold cavity with a closed space, the upper mold has a heating element, and the lower mold has a heating element.

Thereby, the invention provides the paddle racket manufacturing method that uses classified processing to avoid material degradation/deterioration caused by consistent processing to improve a quality of the paddle racket and ensure a performance of the paddle racket.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF DRAWINGS

The above objects and advantages of the invention will become more readily apparent to those ordinarily skilled in the art after reviewing the following detailed description and accompanying drawings, in which.

DETAILED DESCRIPTION OF THE INVENTION

Figure 1:
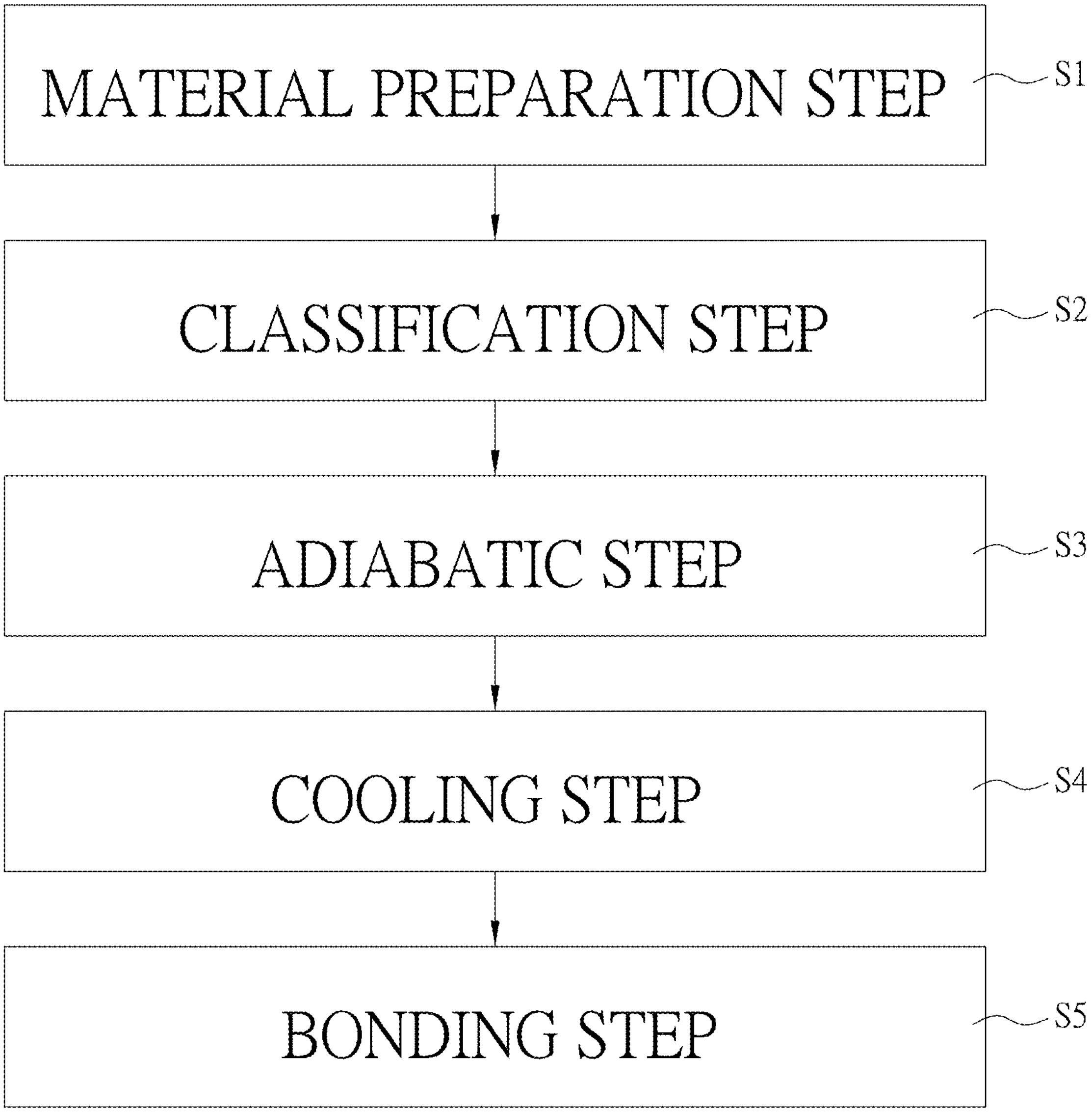
FIG. 1: A flow chart of a paddle racket manufacturing method of the invention.
Figure 2:
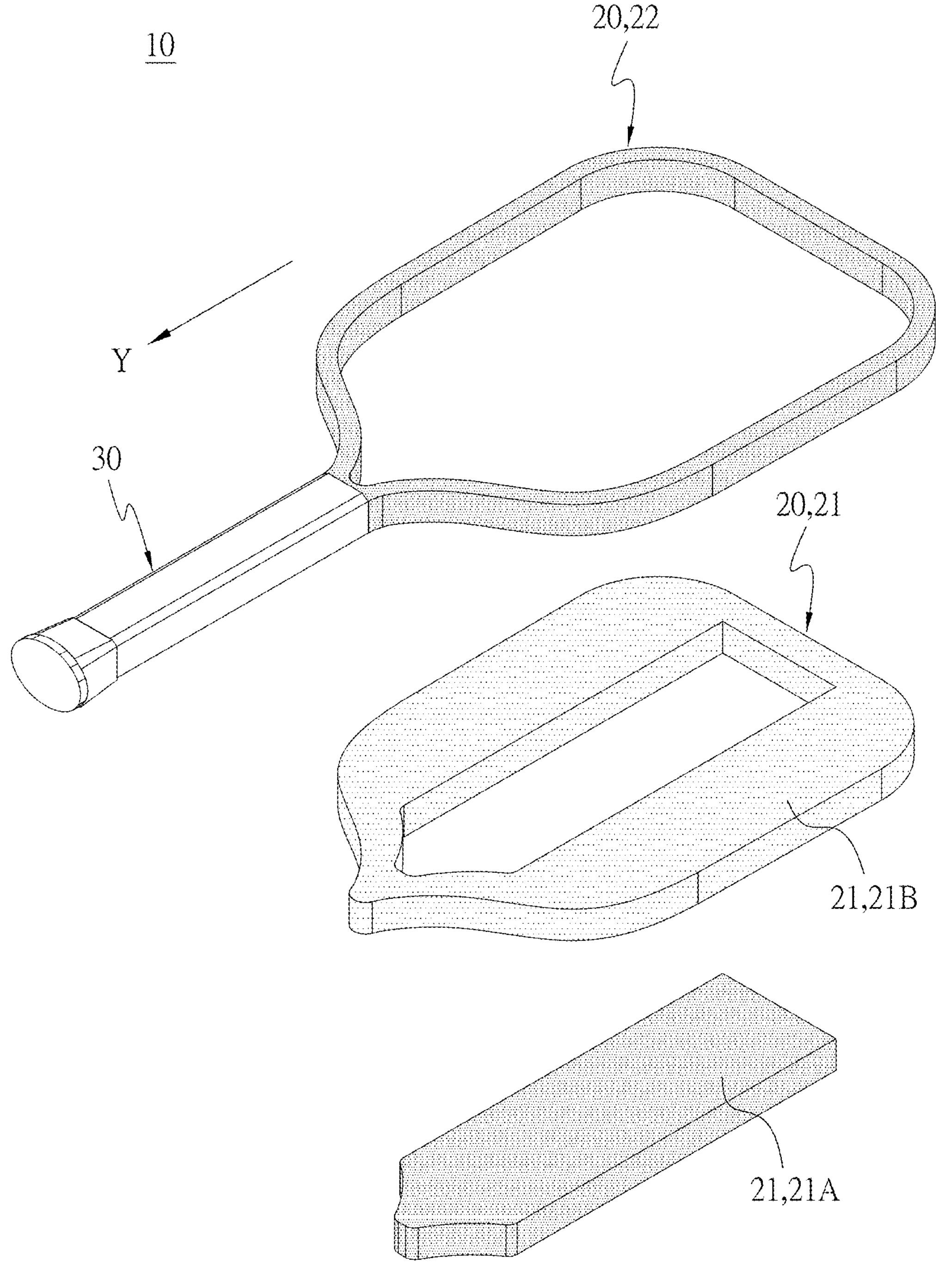
FIG. 2: A schematic diagram of a material preparation step of a centralized core using a rib structure in the paddle racket manufacturing method of the invention.

The invention provides a paddle racket manufacturing method. Please refer to FIGS. 1 to 7 at the same time. A paddle racket of the invention uses a pickleball paddle 10 as an embodiment. However, the invention can also be applied to rackets of different ball sports, for example, table tennis paddle or beach paddle.

Please refer to FIGS. 1 to 7 at the same time, the paddle racket manufacturing method comprises following steps.

A Material Preparation Step S1:

The material preparation step S1 preparing a plurality of processing components of a paddle racket. Please refer to FIGS. 2 to 7. Taking the plurality of processing components as a pickleball paddle 10 as an example. The plurality of processing components comprise a paddle body 20 and a grip body 30. The paddle body 20 has a core 21, a frame 22 and two surface layers 23. The grip body 30 is formed along a direction Y from a bottom side of the frame 22 of the paddle body 20, the grip body 30 can be formed by extending or connecting. The direction Y is used as a reference and the invention is not limited to the direction Y.

The core 21 of the paddle body 20 can further be selected from either a rib structure or a honeycomb structure or a combination thereof, but is not limited thereto. Please refer to the rib structure of FIGS. 2 to 5, and refer to FIG. 7 of U.S. patent application Ser. No. 14/971,011, filed Dec. 16, 2015, and its technical content, which are incorporated by reference into the invention. In addition, please refer to the honeycomb structure of FIGS. 6 to 7, and refer to FIG. 1 of U.S. patent application Ser. No. 15/703,011, filed Sep. 13, 2017, and its technical content, which are incorporated by reference into the invention. The aforementioned patents are for illustration and are not intended to limit the core 21.

The core 21 of the paddle body 20 can further be selected from either a centralized core or a segmented core or a combination thereof, but is not limited thereto. Please refer to the centralized core of FIGS. 2 to 7, and refer to FIG. 2 of U.S. patent application Ser. No. 18/581,545, filed Feb. 20, 2024, and its technical content, which are incorporated by reference into the invention. In addition, please refer to FIG. 2 of U.S. patent application Ser. No. 18/597,429, filed Mar. 6, 2024, and its technical content for the segmented core, which are incorporated by reference into the invention. The aforementioned patents are for illustration and are not intended to limit the core 21. The centralized core and the segmented core are modified embodiments based on the rib structure.

Please refer to FIGS. 2 to 7. The paddle body 20 of the invention adopts the centralized core with the rib structure or the honeycomb structure as an embodiment.

A Classification Step S2:

The classification step S2 is performed after the material preparation step S1, classifying each of the plurality of processing components into a pre-adiabatic processing component and a non-adiabatic processing component according to a heating characteristic (such as temperature, time) and a pressurizing characteristic (such as pressure) corresponding to a material characteristic of its composition (such as carbon fiber).

The pre-adiabatic processing component has a base material and a fiber layer covering the base material. The fiber layer can be in the form of cloth or sheet, and the fiber layer can be composed of carbon fiber or glass fiber.

The frame 22 is classified as a pre-adiabatic processing component. A base material of the frame 22 can be composed of polyethylene (PE) or ethylene vinyl acetate (EVA) copolymer. A fiber layer of the frame 22 can be composed of carbon fiber or glass fiber.

The non-adiabatic processing component is a heat-sensitive material, such as plastic, polyethylene and ethylene vinyl acetate (EVA) copolymer.

Although the frame 22 uses a heat-sensitive material as the base material, the base material is covered with the fiber layer, and an adiabatic object is the fiber layer, so the frame 22 is classified as a pre-adiabatic processing component.

Ethylene vinyl acetate (EVA) copolymer is commonly found in centralized cores with rib structures (please refer to FIGS. 2 to 5). The core 21 has a first component 21A, which is classified as a pre-adiabatic processing component. A base material of the first component 21A can be composed of hard plastic or hard foam, and a fiber layer of the first component 21A can be composed of carbon fiber or glass fiber. The core 21 further has a second component 21B disposed between the frame 22 and the first component 21A, which is classified as a non-adiabatic processing component. Polyethylene (PE) or ethylene vinyl acetate (EVA) copolymer is used in the second component 21B. Although the first component 21A uses a heat-sensitive material as the base material, the base material is covered with the fiber layer, and an adiabatic object is the fiber layer, so the first component 21A is classified as a pre-adiabatic processing component.

Figure 6:
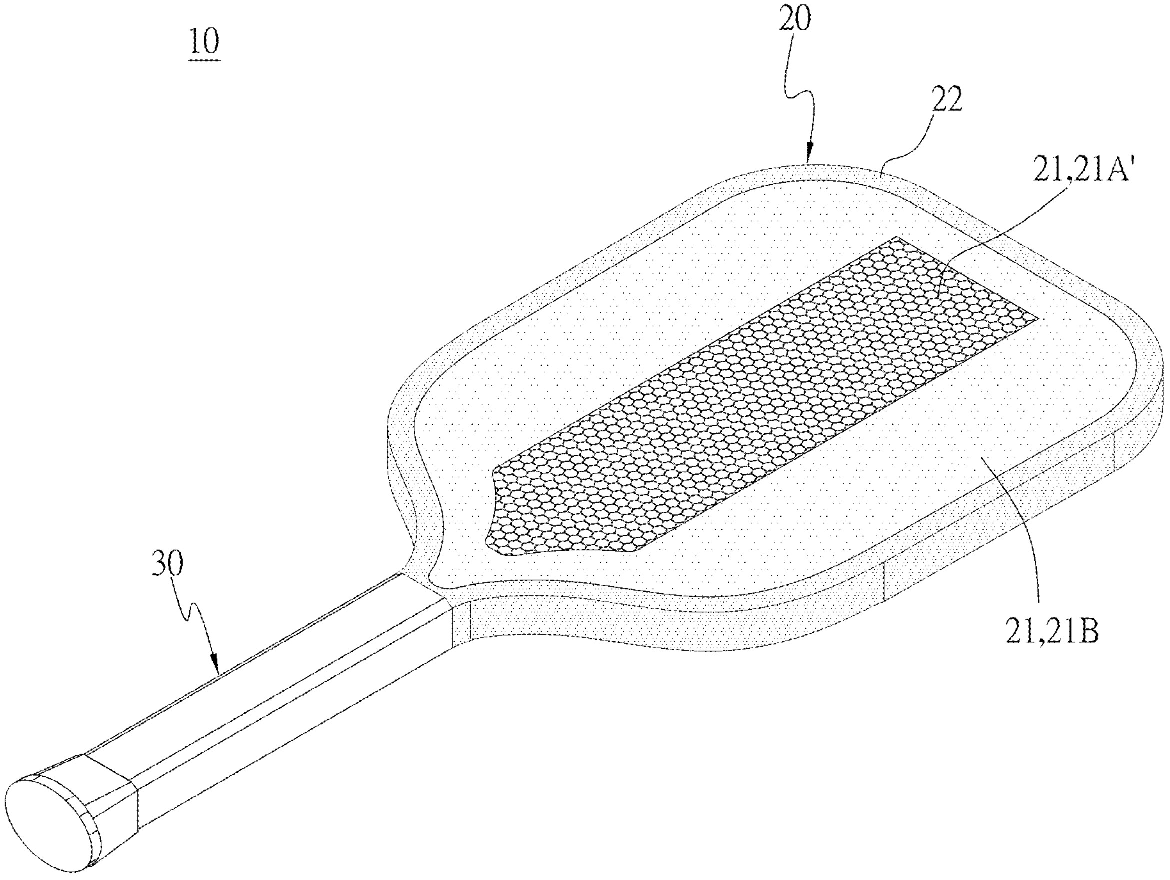
FIG. 6: A first schematic diagram of the bonding step of the centralized core using a honeycomb structure in the paddle racket manufacturing method of the invention.
Figure 7:
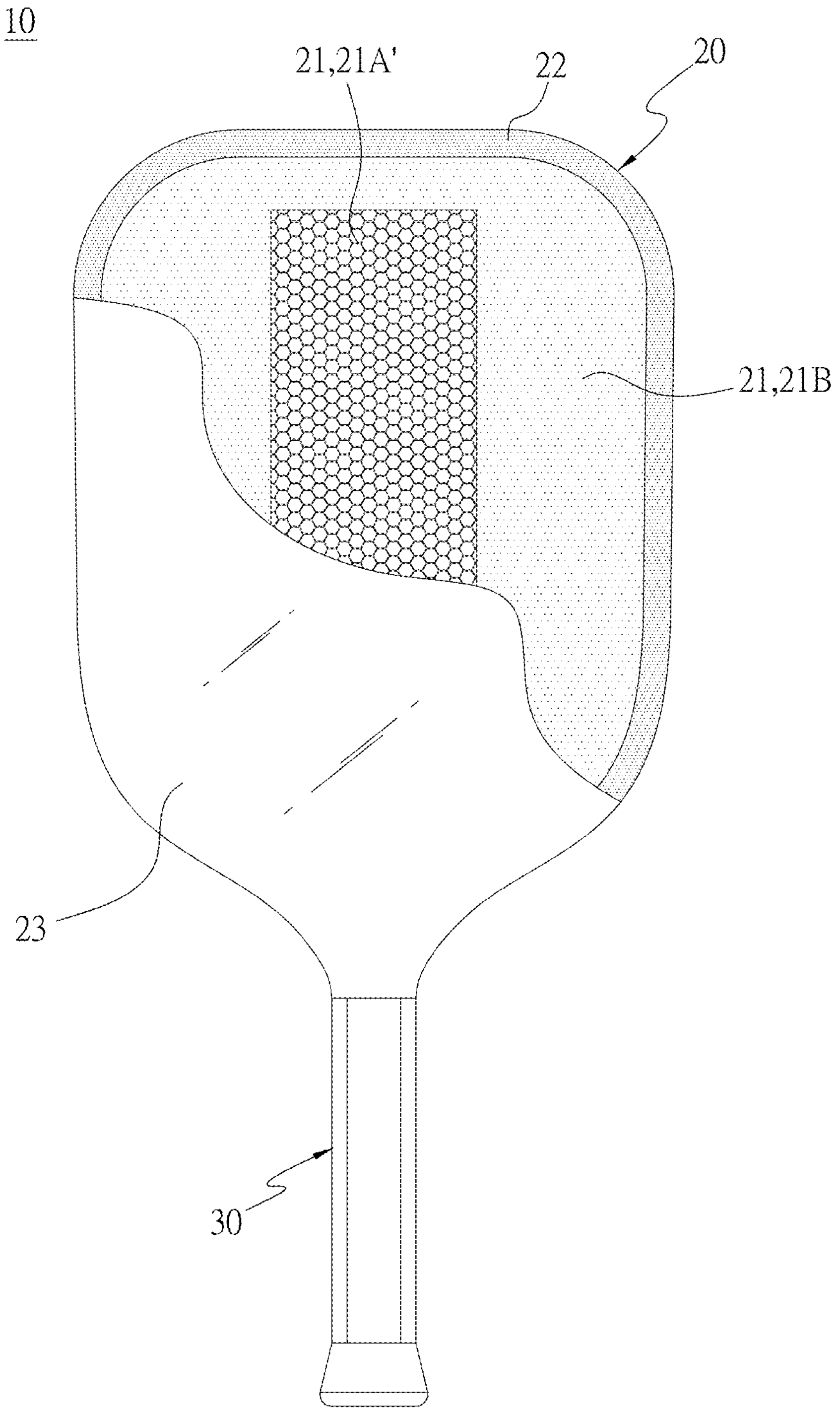
FIG. 7: A second schematic diagram of the bonding step of the centralized core using the honeycomb structure in the paddle racket manufacturing method of the invention.

Plastic is commonly found in the centralized core 21 that adopts a honeycomb structure (please refer to FIGS. 6 and 7). A difference lies in the first component 21A and a first component 21A'. The first component 21A' adopts a honeycomb structure.

The core 21 mentioned above uses the first component 21A and the second component 21B, or the first component 21A' and the second component 21B, or only the first components 21A, 21A', and areas of the first components 21A, 21A' are increased to cover an area of the second component 21B, so that the frame 22 is disposed around the first components 21A, 21A'.

The two surface layers 23 are classified as pre-adiabatic processing components, and the two surface layers 23 are composed of carbon fiber or glass fiber, but are not limited thereto.

An Adiabatic Step S3:

The adiabatic step S3 is performed after the classification step S2, the adiabatic step S3 applying an adiabatic heating to form, forming can use bladder molding, wherein bladder can also be called gasbag, bladder method or ball bladder, forming can also be called shaping, mold pressing or molding.

The adiabatic step S3 preparing a mold 40, placing the pre-adiabatic processing component into a mold cavity 41 of the mold 40, applying an adiabatic heating to form.

Figure 3:
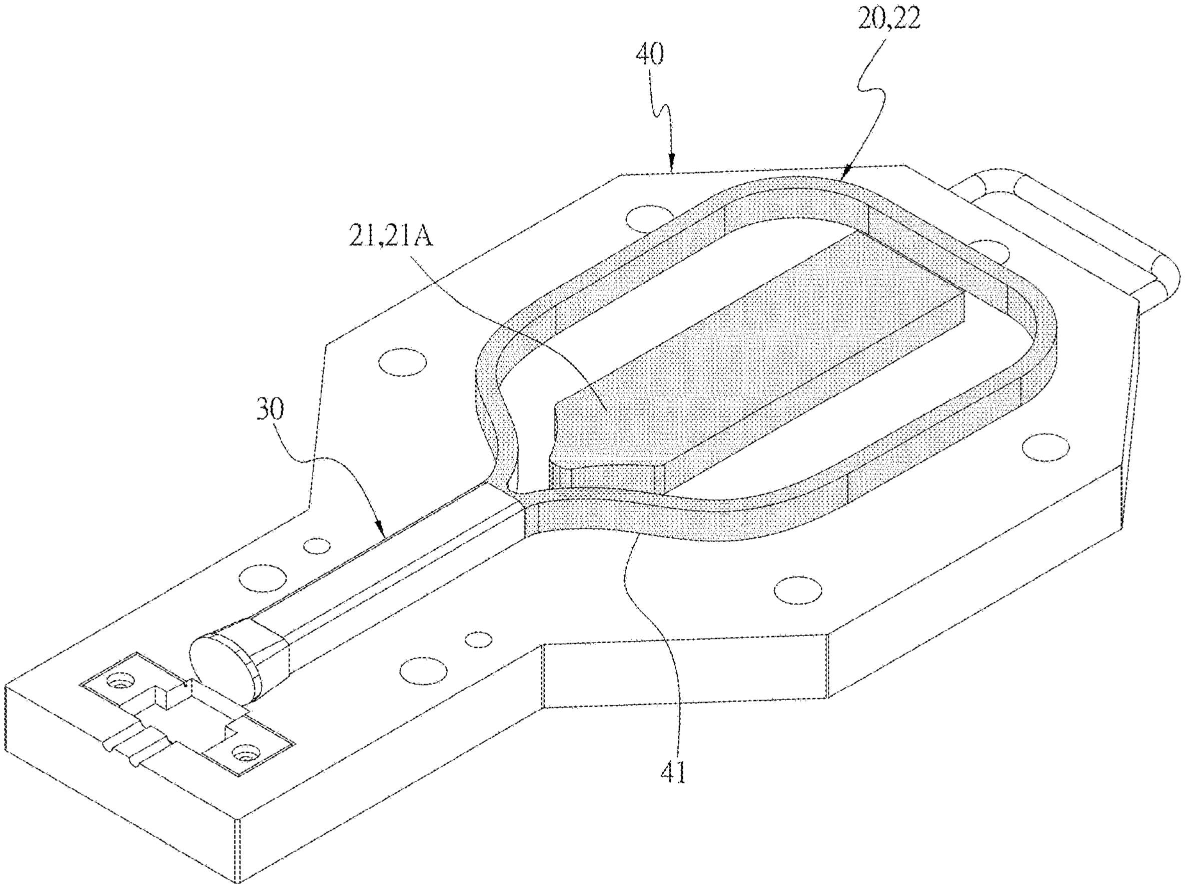
FIG. 3: A schematic diagram of an adiabatic step of the centralized core using the rib structure in the paddle racket manufacturing method of the invention.
Figure 4:
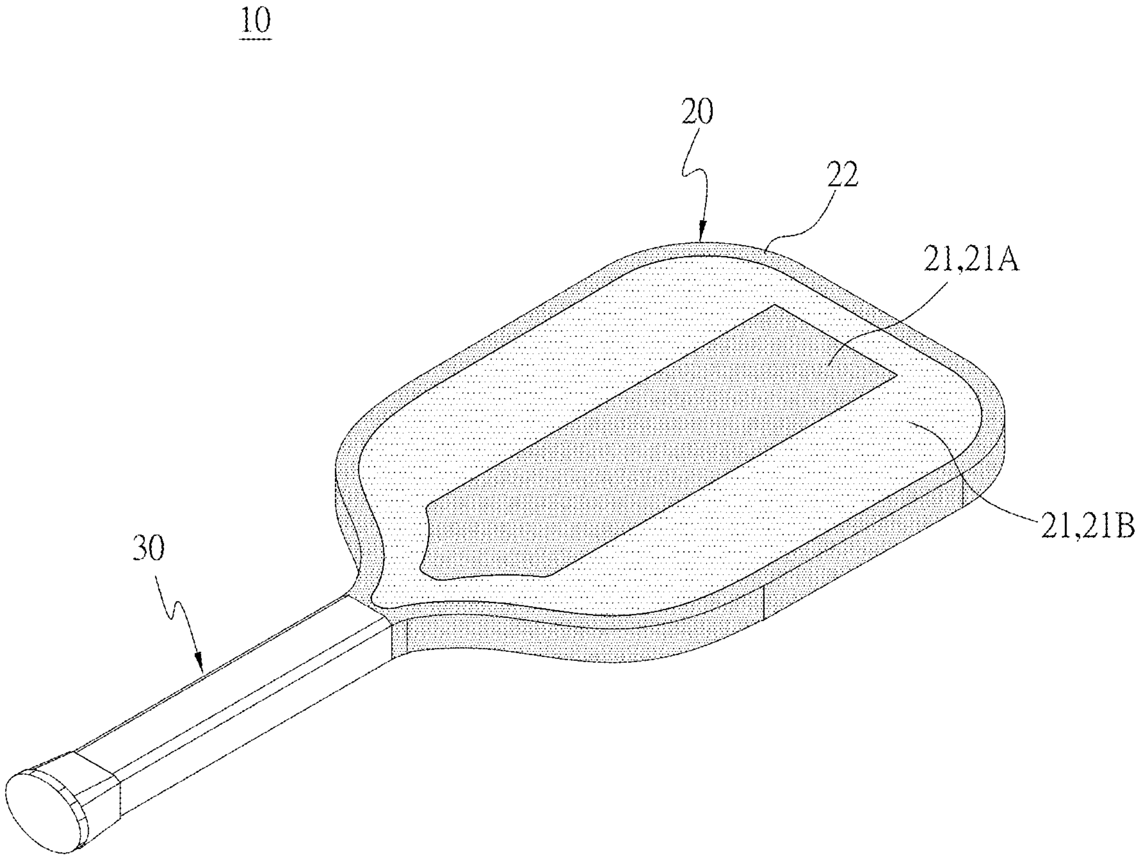
FIG. 4: A first schematic diagram of a bonding step of the centralized core using the rib structure in the paddle racket manufacturing method of the invention.
Figure 5:
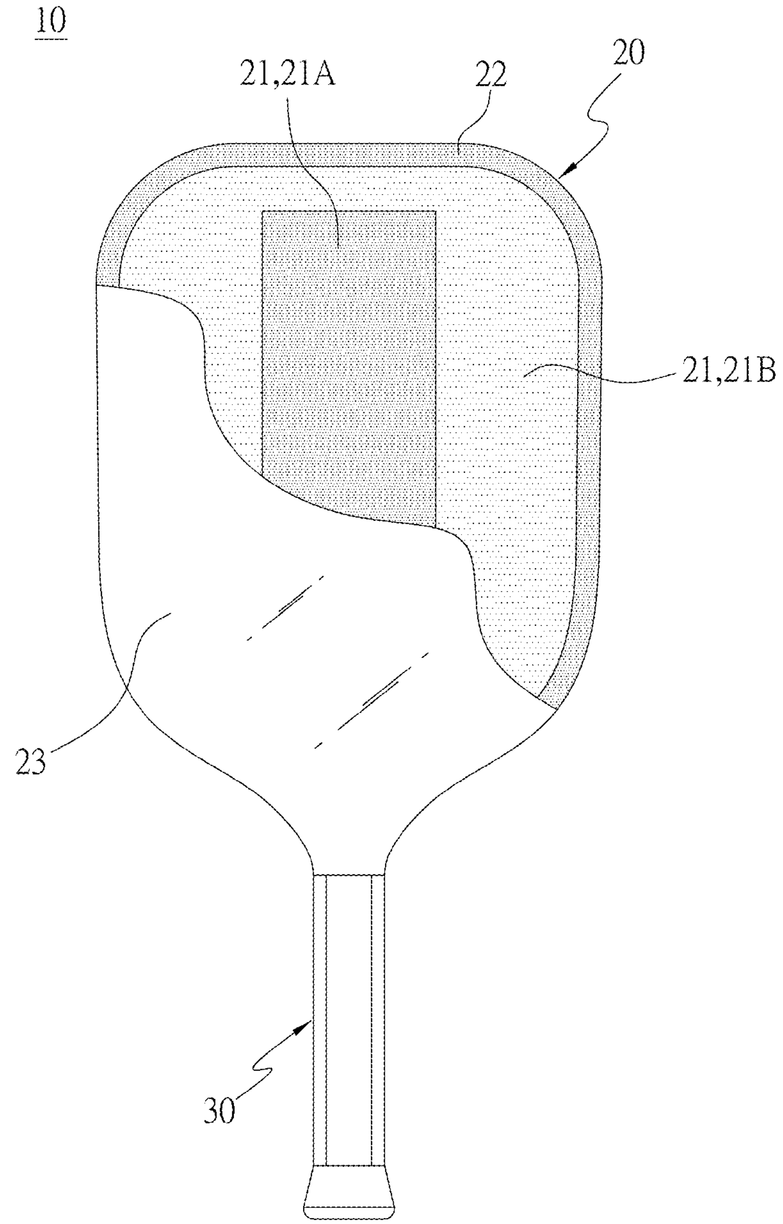
FIG. 5: A second schematic diagram of the bonding step of the centralized core using the rib structure in the paddle racket manufacturing method of the invention.

Please refer to the mold 40 of FIG. 3, and refer to FIG. 3 of Taiwan Patent Application No. TW100107245, filed Mar. 4, 2011, and its technical content, which are incorporated by reference into the invention. The mold 40 usually has an upper mold and a lower mold, the upper mold is combined with the lower mold (one implementation mode of combination is clamping) and a pressure is applied to form the mold cavity 41 with a closed space. An interior of the upper mold and/or the lower mold has a heating element for applying an adiabatic heating by direct heating. The aforementioned patent is for illustration and is not intended to limit the mold 40. Alternatively, an exterior of the upper mold and/or the lower mold applies an adiabatic heating by indirect heating through a heating element.

Applying an adiabatic heating on the pre-adiabatic processing component according to the material characteristic to form a processing component already processed with adiabatic process, a fiber layer of the processing component already processed with adiabatic process adhering to a base material.

The non-adiabatic processing component does not have a fiber layer, does not go through the adiabatic step S3, and is not applied with an adiabatic heating. In addition, although the invention uses the pickleball paddle 10 as an embodiment, a table tennis paddle component or a beach paddle component with a fiber layer are classified as pre-adiabatic processing components, can also go through the adiabatic step S3 and are applied with an adiabatic heating.

The first component 21A, the frame 22 and the two surface layers 23 are all classified as pre-adiabatic processing components. Although the base materials thereof are different from one another or the same as one another, under the consideration allowed by the heating characteristic and the pressurizing characteristic corresponding to the material characteristic, the first component 21A, the frame 22 and the two surface layers 23 can choose to perform the adiabatic step S3 together. If influence produced by the heating characteristic and the pressurizing characteristic corresponding to the material characteristic is considered, the first component 21A, the frame 22 and the two surface layers 23 can also choose to perform the adiabatic step S3 separately. But it is not limited to the first component 21A, the frame 22 and the two surface layers 23, other pre-adiabatic processing components can also refer to the above-mentioned method.

A Cooling Step S4:

The cooling step S4 is performed after the adiabatic step S3, cooling the processing component already processed with adiabatic process to normal temperature.

A Bonding Step S5:

The bonding step S5 is performed after the cooling step S4, using cold bonding without using heat to connect any two of the components. One embodiment of cold bonding is using adhesive to connect any two of the components. The components can be either the processing component already processed with adiabatic process or the non-adiabatic processing component or a combination thereof.

After the pickleball paddle 10 of the invention is bonded (please refer to FIGS. 5 and 7), the frame 22 is disposed on a peripheral side of the core 21, and the two surface layers 23 are spaced apart from each other and respectively assembled on the core 21 and the frame 22 on two sides of the paddle body 20.

The descriptions such as "first" and "second" mentioned in the invention are for distinction and do not represent a sequence.

Summing up the above, the invention provides the paddle racket manufacturing method, which classifies the plurality of processing components into the pre-adiabatic processing component and the non-adiabatic processing component according to the heating characteristic and the pressurizing characteristic corresponding to the material characteristic, and applies the adiabatic heating on the pre-adiabatic processing component according to the material characteristic to form the processing component already processed with adiabatic process. Thereby, using classified processing to avoid material degradation/deterioration caused by consistent processing to improve a quality of the paddle racket and ensure a performance of the paddle racket. In actual applications, it is helpful for an operator to control the time a ball stays on the paddle racket, and it is also helpful for the operator to control a rotation force of the paddle racket on the ball.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A paddle racket manufacturing method comprising:

a material preparation step preparing a plurality of processing components of a paddle racket;

a classification step classifying each of the plurality of processing components as either a pre-adiabatic processing component or a non-adiabatic processing component according to a heating characteristic and a pressurizing characteristic corresponding to a material characteristic of its composition, wherein the plurality of processing components include one or more pre-adiabatic processing components and one or more non-adiabatic processing components, and at least one of the one or more pre-adiabatic processing components has a base material and a fiber layer covering the base material;

an adiabatic step preparing a mold, placing the at least one of the one or more pre-adiabatic processing components having the base material and the fiber layer into a mold cavity of the mold, applying an adiabatic heating on the at least one of the one or more pre-adiabatic processing components according to the material characteristic to form at least one adiabatically processed component, the fiber layer of the at least one adiabatically processed component adhering to the base material;

a cooling step cooling the at least one adiabatically processed component after the adiabatic step; and a bonding step, occurring after the cooling step, using cold bonding without using heat to connect at least one adiabatically processed component with at least one of the one or more non-adiabatic processing components.

2. The paddle racket manufacturing method as claimed in claim 1, wherein the plurality of processing components comprise a paddle body and a grip body, the paddle body has a core, a frame and two surface layers, the frame is disposed on a peripheral side of the core, the two surface layers are spaced apart from each other and respectively assembled on the core and the frame on two sides of the paddle body, the grip body is formed from a bottom side of the frame of the paddle body.

3. The paddle racket manufacturing method as claimed in claim 2, wherein the frame is classified as one of the one or more pre-adiabatic processing components, the base material of the frame is composed of polyethylene or ethylene vinyl acetate copolymer, the fiber layer of the frame is composed of carbon fiber or glass fiber, the two surface layers are each classified as one of the one or more pre-adiabatic processing components, and the two surface layers are composed of carbon fiber or glass fiber.

4. The paddle racket manufacturing method as claimed in claim 2, wherein the paddle body is a rib structure, the core has a first component classified as one of the one or more pre-adiabatic processing components, the frame is disposed on a peripheral side of the first component, the base material of the first component is composed of hard plastic or hard foam, and the fiber layer of the first component is composed of carbon fiber or glass fiber.

5. The paddle racket manufacturing method as claimed in claim 2, wherein the paddle body is a honeycomb structure, the core has a first component classified as one of the one or more non-adiabatic processing components, the frame is disposed on a peripheral side of the first component, and the first component is composed of plastic.

6. The paddle racket manufacturing method as claimed in claim 2, wherein the paddle body is a centralized core, the core has a first component classified as one of the one or more pre-adiabatic processing components, the base material of the first component is composed of hard plastic or hard foam, the fiber layer of the first component is composed of carbon fiber or glass fiber, the core has a second component disposed between the frame and the first component, the second component is classified as one of the one or more non-adiabatic processing components, and the second component is composed of polyethylene or ethylene vinyl acetate copolymer.

7. The paddle racket manufacturing method as claimed in claim 2, wherein the paddle body is a centralized core, the core has a first component classified as one of the one or more non-adiabatic processing components, the first component is composed of plastic, the core has a second component disposed between the frame and the first component, the second component is classified as another of the one or more non-adiabatic processing components, and the second component is composed of polyethylene or ethylene vinyl acetate copolymer.

8. The paddle racket manufacturing method as claimed in claim 1, wherein each of the one or more non-adiabatic processing components is a heat-sensitive material, and the heat-sensitive material is plastic, polyethylene or ethylene vinyl acetate copolymer.

9. The paddle racket manufacturing method as claimed in claim 1, wherein the adiabatic step applies the adiabatic heating and uses a bladder molding to form the at least one adiabatically processed component.

10. The paddle racket manufacturing method as claimed in claim 1, wherein the mold of the adiabatic step has an upper mold and a lower mold, the upper mold is combined with the lower mold and a pressure is applied to form the mold cavity with a closed space, the upper mold has a heating element, and the lower mold has a heating element.

* * * * *